United States Patent
Barbee et al.

(10) Patent No.: US 10,592,389 B2
(45) Date of Patent: *Mar. 17, 2020

(54) INTEGRATING SYNTHETIC PERFORMANCE MEASUREMENTS WITH CONTINUOUS DELIVERY PIPELINES

(71) Applicant: International Business Machines Corporation, Armonk, NY (US)

(72) Inventors: Laquicia S. Barbee, Durham, NC (US); Erica M. Brown, Durham, NC (US); Martin J. C. Presler-Marshall, Durham, NC (US); Shikha Srivastava, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,107

(22) Filed: Jan. 21, 2019

(65) Prior Publication Data

US 2019/0163607 A1 May 30, 2019

Related U.S. Application Data

(63) Continuation of application No. 15/488,497, filed on Apr. 16, 2017, now Pat. No. 10,296,438.

(51) Int. Cl.
*G06F 11/36* (2006.01)
*G06F 8/60* (2018.01)
(Continued)

(52) U.S. Cl.
CPC ............ *G06F 11/3612* (2013.01); *G06F 8/60* (2013.01); *G06F 11/3006* (2013.01);
(Continued)

(58) Field of Classification Search
CPC ............ G06F 11/3612; G06F 11/3688; G06F 11/3692; G06F 11/34; G06F 9/44589; G06F 11/3466; G06F 8/60
See application file for complete search history.

(56) References Cited

U.S. PATENT DOCUMENTS 6,434,513 B1   8/2002   Sherman
9,183,123 B2   11/2015  Spektor
(Continued)

FOREIGN PATENT DOCUMENTS

WO    2014027990 A1    2/2014

OTHER PUBLICATIONS

Cito, J., et al.; Identifying Web Performance Degradations Through Synthetic and Real-user Monitoring; Journal of Web Engineering. vol. 14, No. 5 & 6 (2015), pp. 414-442.
(Continued)

*Primary Examiner* — Phillip H Nguyen
(74) *Attorney, Agent, or Firm* — Christopher M. Pignato

(57) ABSTRACT

Continuous development pipeline systems and in-field synthetic performance test systems are interlocked to provide for automated control of promotion of program code elements within the development pipeline and in the deployment environment using relative comparative performance values rather than absolute performance thresholds, in order to better accommodate "last mile" variations in client device conditions.

18 Claims, 4 Drawing Sheets

(51) Int. Cl.
*G06F 11/34* (2006.01)
*G06F 8/71* (2018.01)
*G06F 11/30* (2006.01)

(52) U.S. Cl.
CPC .......... *G06F 11/34* (2013.01); *G06F 11/3688* (2013.01); *G06F 11/3692* (2013.01); *G06F 8/71* (2013.01)

(56) References Cited

U.S. PATENT DOCUMENTS

| | | |
|---|---|---|
| 2004/0221034 A1 | 11/2004 | Kausik |
| 2010/0095276 A1 | 4/2010 | Ottavi |
| 2016/0026640 A1 | 1/2016 | Hart |
| 2016/0210215 A1 | 7/2016 | Shani et al. |
| 2016/0299829 A1* | 10/2016 | Wei ...................... G06F 11/3604 |
| 2017/0180266 A1* | 6/2017 | Frank ...................... H04L 67/16 |
| 2018/0300331 A1 | 10/2018 | Barbee et al. |

OTHER PUBLICATIONS

Skopik, F., et al.; "Semi-synthetic Data Set Generation fro Security Software Evaluation", Privacy, Security and Trust (PST), 2014 Twelfth Annual International Conference on, Jul. 23-24, 2014, INSPEC Accession No. 14566949, IEEE Explore.

Keubrich, D.; "End-user Monitoring: RUM or Synthetic?", retrieved on Mar. 8, 2017 from https://www.appneta.com/blog/rum-vs-synthetic/.

Tozzi, C.; "Continuous Integration vs. Delivery vs. Deployment: What's the difference?", retrieved on Feb. 9, 2017, from https://devops.com/continuous-integration-vs-delivery-vs-deployment-whats-difference/.

Contributor; "Continuous Delivery snapshot: a universe of fragmented tools", retrieved on Feb. 9, 2017, from https://devops.com/continuous-delivery-snapshot-universe-fragmented-tools/.

Schmidt, M.; "DevOps and Continuous Delibery: Not the Same", retrieved on Feb. 9, 2017, from https://devops.com/devops-and-continuous-delivery-not-same/.

Dynatrace; "Synthetic Test", retrieved on Feb. 8, 2017, from https://www.dynatrace.com/topics/performance-test/synthetic-test/.

Blatstein, M.; "Jenkins 2.0 Advances Continuous Delivery with Native Pipeline Support and Usability Enhancements", retrieved on Feb. 9, 2017, from https://devops.com/jenkins-2-0-advances-continuous-delivery-native-pipeline-support-usability-enhancements/.

Laster, B.; "Configuring a continuous delivery pipeline in Jenkins", retrieved on Mar. 7, 2017, from https://www.oreilly.com/learning/configuring-a-continuous-delivery-pipeline-in-jenkins.

Everts, T.; "Performance Monitoring 101: A beginner's guide to understanding synthetic and real user monitoring", retrieved on Mar. 8, 2017 from https://www.soasta.com/blog/synthetic-real-user-measurement-monitoring-rum/.

Wikipedia; "Synthetic monitoring", retrieved on Feb. 9, 2017, from https://en.wikipedia.org/wiki/Synthetic_monitoring.

International Business Machines Corp.; "IBM Patent Applications to be Treated as Related", Jan. 21, 2019.

Humble et al., "Continuous Delivery: Reliable Software Releases Through Build, Test, and Deployment Automation" (Year: 2011).

Lee et al., "Toward Agile: An Integrated Analysis of Quantitative and Qualitative Field Data on Software Development Agility" (Year: 2010).

William E. Lewis, "Software Testing and Continuous Quality Improvement" (Year: 2000).

\* cited by examiner

INTEGRATING SYNTHETIC PERFORMANCE MEASUREMENTS WITH CONTINUOUS DELIVERY PIPELINES

BACKGROUND

This is a continuation application of U.S. patent application Ser. No. 15/488,497, filed on Apr. 16, 2017. This invention relates generally to methods and systems for verifying and monitoring software, hardware, and systems performance throughout a development and deployment life cycle.

Quality of service and performance are crucial issues for suppliers of web-based services, such as online transaction handling (e.g., reservations, tickets, finance, etc.), online information sources (e.g., news websites, search engines, etc.), and distributed enterprise computing resources (e.g., software as a service, cloud computing, on-demand computing, etc.), just to name a few. During development, attempt to simulate real-world conditions including hardware platforms, software configurations, and network delays can provide initial visibility into performance of computer programs, but actual performance testing of the computer programs "in the field" remains a challenge.

As the term is used herein, a "synthetic performance test" (also sometimes referred to as "synthetic user performance test", "synthetic measurement", "synthetic monitoring", "active monitoring", "proactive monitoring", and "synthetic testing") refers to any performance test, or monitoring, where website monitoring performed using a Web browser emulation or scripted recordings of Web transactions. Typically, behavioral scripts (or paths) are created to simulate an action or path that a customer or end-user would take on the website(s) being performance tested. These paths are then intermittently (for example, continuously) monitored for performance (for example, functionality, availability, and/or response time). Synthetic user performance testing is typically valuable because it enables a an information technology (IT) professional to identify problems and determine if a website or Web application is slow or experiencing downtime before a problem affects actual end-users or customers. Also, this type of monitoring typically does not require actual Web traffic. Synthetic user performance tests are sometimes used as a complement to passive monitoring to help provide visibility on application health during time periods when transaction volume is low. Because synthetic monitoring is a simulation of typical user behavior or navigation through a website, it is typically used to monitor commonly trafficked paths and critical business processes. Synthetic user performance tests are typically scripted in advance, so it is not typically feasible to measure performance for every permutation of a navigational path an end-user might take. Synthetic user performance testing is typically used for measuring uptime, availability and response time of critical pages and transaction (e.g., how a site performs from all geographies), but typically doesn't monitor or capture actual end-user interactions.

SUMMARY OF THE INVENTION

Continuous development pipeline systems and in-field synthetic performance measurements are interlocked to provide for automated control of promotion of program code elements within the development pipeline and in the deployment environment using relative comparative performance values rather than absolute performance thresholds, in order to better accommodate "last mile" variations in client device conditions.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Problems Recognized

Figure 1:
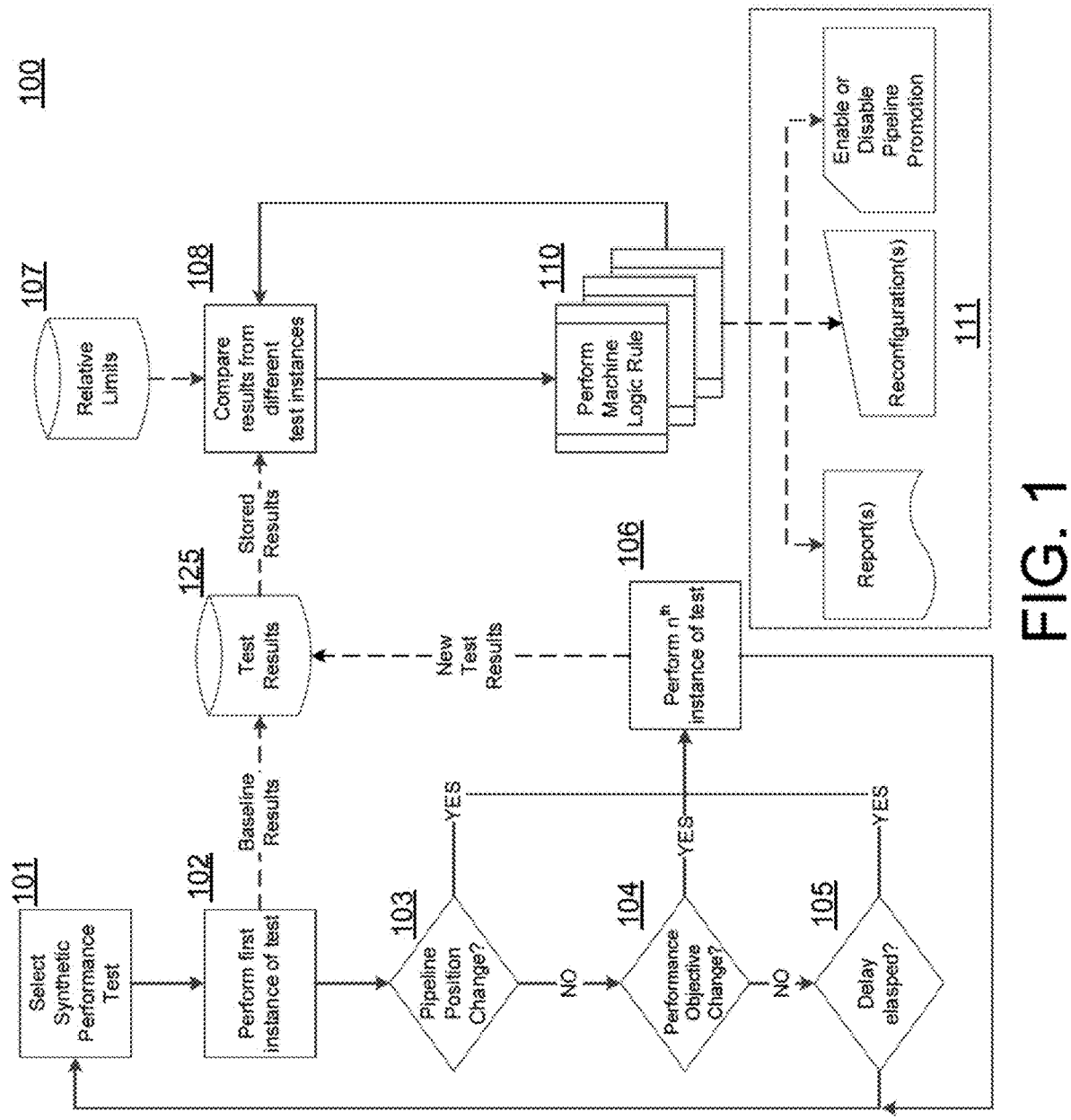
FIG. 1 illustrates logical processes according to at least one embodiment of the present invention.

The inventors have recognized that, today, the existing solutions for testing and verifying quality of service (QoS) and performance of new software programs and changes to existing software programs leaves many needs unmet. As software is developed through structured processes and methodologies, preliminary testing provides some insight into possible QoS and performance issues, but it is very difficult to simulate all possible combinations of hardware, software, and computer network conditions which an application program may experience when deployed in the field, such as over a broadly-distributed geographic user base. Field-based testing can supplement the developmental testing, but also certain blind spots remain.

In particular, the present inventors have recognized that many objectives for QoS and performance are set forth, verified, and monitored in absolute terms. For example, a particular online shopping server may be specified to respond to a click on a tab for a category of "women's shoes" within 3 seconds, regardless of geographic location, time of day, client computer loading, server loading, etc. The theory driving the 3 second limit may be related to marketing and user behavior, wherein it is believed that a user will not wait longer and will click to another, usually competitive, website if the delay is longer.

However, the present inventors have recognized that users of online websites are not so simplistic in their behavior. Although the users may not know the specifics of how computer networks actually work and how servers are managed during peak-load periods, they learn from experience that certain times and locations of usage usually result in slower responses. As such, online users of web sites and web-based services have different expectations of internet performance under different conditions which they encounter occasionally and/or frequently. For example, when using a Wi-Fi connection in an airport and the airport is visibly crowded, users are more tolerant of delays because they literally see other users competing for the network bandwidth. Similarly, during a peak advertisement period, such as during advertisements during a very popular sports broadcast, users know from experience that trying to immediately respond to the advertisement by going to a particular related website will likely incur longer-than-normal delays. For at least these reasons, the present inventors have realized that user expectations are more plastic, and are not well represented by absolute objects to QoS and performance criteria.

The present inventors have also realized that the distributed nature of computing in the modern world is unpredictable, and many factors are simply out of the control of a particular service provider. While a cloud-based enterprise solutions provider may agree to a certain performance criteria, adherence to such criteria is known to be impossible due to large variations in the "last mile" network performance as a function of demand, time, and even weather conditions. "Last mile" performance refers to the final data link segment, such as a Wi-Fi network in an airport, and the user's equipment, such as a tablet computer, which is trying to connect to and use a server-based service being operated by the solutions provider. For at least this reason, the present inventors have realized that current technologies which are designed to test and monitor against tightly-defined absolute QoS and performance objectives are unrealistic, and are often disregarded because of such, which reduces the effectiveness of even attempting to specify performance criteria. As a result, many code and system designers will loosely define absolute QoS and performance objectives with wide margins of error, which may allow significant problems to exist when the systems are operating "live" in the field without their being detected, which is also undesirable.

General Principles of Operation

For companies engaged in the business of delivering software as a service, such as a cloud-based application, it is desirable for the application program and its components to be updated regularly, easily, and with the assurance that end users will be happy with it when updates are delivered. This last point is a crucial one: "end users will be happy with it". This encompasses a huge range of concerns, from appearance, to functional correctness, availability, stability, capacity under load, and technical performance (delays, accuracy, privacy, etc.). This means that a large battery of tests must be executed against test/staging environments before the code in question becomes active in production. And, while systems exist to help with many of those questions, the present inventors have recognized a significant gap: worldwide performance measurements.

Today, a variety of systems exist for executing worldwide performance measurements of Web sites, commonly referred to as "synthetic measurement", "synthetic monitoring", "active monitoring", "proactive monitoring", and "synthetic testing" systems. For the purposes of this disclosure, we will refer these types of performance measurement and monitoring systems collectively. Systems such as these typically provide a script which executes a predetermined set of simulated user interactions from a client device against a website or web-hosted service. The test script is executed from a multiple locations around the world, possibly with different types of browsers or different end user client device types, while measurements are made of the performance as experienced by those client devices. This provides a degree of real-world experience which lab-based measurements can't match, and it shows what the performance may be for a real user who is actually located in the same geographic location as the test client, rather than lab conditions which are supposed to be, but often are not similar.

As such, many available test and monitoring systems exist which will execute functional tests or load tests as part of a continuous deployment pipeline, and then promote or reject updates through that pipeline. However, none of these systems appear to link to worldwide synthetic measurements to use the actual experience from a variety of locations to determine if a given code update is ready for promotion to the next stage in the continuous deployment pipeline. The present inventors, having recognized this unmet need in the art, therefore have proceeded to define a new system, method and computer program product to provide visibility of application program performance as seen by client devices located around the world, and to automatically decide whether to promote or reject a particular program change based on that observed performance.

Systems and methodologies to build, test, and deploy software products and updates using automation workflow engines are well known in the art. The present invention is useful for all of the existing systems and methodologies to improve and enhance their usability, quality of product, and predictability of outcomes. Although at least one embodiment according to the present invention will be described herein relative to improvements to the well-known "Jenkins" continuous pipeline methodology and tools, it will be recognized by those skilled in the art that similar improvements to other software development, test, and deployment systems and methodologies can be realized according to the present invention. As such, the exemplary embodiment which is disclosed relative to the Jenkins 2.0 open-source project does not define the limits or scope of the present invention.

Jenkins, for example, supports building a workflow from a number of steps, triggering workflows based on events, evaluating the success or failure of each of the workflow steps, and then proceeding or rejecting changes based on the steps of the workflow. Jenkins is a "pluggable system", meaning that custom modules can be attached to steps of the workflow: either to trigger the start of a workflow, to execute a step in the workflow, or report output from a workflow. This expandability provides an opportunity for implementation of improvements such as embodiments of the present invention.

Likewise, a number of synthetic performance measurement solutions are commercially available, and the disclosed exemplary embodiments will be made relative to such existing systems. However, those ordinarily skilled in the art will recognize that other embodiments of the present invention are possible using custom or proprietary distributed remote testing and monitoring solutions, or using other open or standardized remote testing and monitoring technologies. Examples of such a commercially-available synthetic testing solutions or application performance monitoring (APM) products are Proxima™, Gomez™, CompuWare™, Dynatrace™, AppDynamics™, Anturis™, AppNeta™, BigPanda™, Boundary™, CopperEgg™, just to name a few. An exemplary embodiment is disclosed relative to realization as an improvement to the well-known Gomez tool, which supports building a scripted user interaction, deploying it to measurement systems around the world, but those skilled in the art will recognize that similar embodiments may be made with other APM tools and systems. Gomez, for example, currently provides over 100 points of presence (PoP) on all continents except Antarctica, thereby reporting in-field performance testing and monitoring results from a wide variety of geographic locations. Another example is New Relic™, which provides live monitoring of a production or test environment, and can also integrate synthetic monitoring scripts which execute user interactions from multiple locations.

Further, the disclosed embodiment incorporates Jenkins plug-ins which already exist to trigger executions of synthetic performance measurement scripts as part of a continuous delivery pipeline. For example, once a software build has completed, deployed to a staging system, and has undergone some functional tests against that staging system, an available Jenkins plug-in can automatically launch a synthetic performance measurement via an APM system, such as Gomez or New Relic.

However, the present inventors have realized that there is no return integration between the Jenkins continuous development pipeline systems and the APM systems, i.e., there's no way to automatically pass or fail the software build in the pipeline based on the synthetic performance measurements. Instead, a test engineer must manually go look at the APM results from the synthetic performance measurement system, and take corrective action if he or she does not like the observed results. The present inventors have realized that this subjective, manual link to provide feedback from the in-field testing and verification to stages in the pipeline is antithetical to how a continuous delivery system is meant to work.

As such, an objective of the present invention is to interlock synthetic performance measurements and synthetic monitoring results to the continuous delivery pipeline at all stages such that a software developer can create a test script along with the software feature code that he or she codes as part of the feature, wherein feature code and the associated synthetic monitoring script flows through the development pipeline together. In this manner, the synthetic monitoring script is treated like any other development-stage test case, albeit the synthetic monitoring script is useful for in-field testing via an appropriate APM system. In one embodiment, the continuous delivery pipeline is improved to include a Synthetic Performance Test execution stage which executes the synthetic performance test scripts associated with the new or modified program code. In-field performance results are gathered for each step of the synthetic performance test script and for each location defined as part of the test from the APM. The metrics gathered at this step may include the usual statistics gathered in a performance measurement, such as minimum, average, median, 95th percentile, maximum, etc. Each set of test results are associated with the location from which it was executed, as well as client device characteristics, such as the type of browser used and the configuration of hardware device used for the test (e.g., O/S, processor, memory, network interface speed, etc.). The results of the Synthetic Performance Test stage are then automatically evaluated to determine if the user experience would pass as a satisfactory across the chosen geographic locations and client device variations.

This will enable usage of the continuous delivery model while being confident that users of new programs and program updates will be satisfied with the performance of the application, from around the world and on multiple browsers and multiple types of client devices.

So, according to the embodiments of the present invention, the synthetic performance measurements are launched as a step within the continuous delivery pipeline. However, unlike the existing continuous development pipeline solutions, the improved process and system pipeline holds the code under development in certain pipeline stages until the synthetic performance measurements complete. It then automatically evaluates the synthetic performance measurements for each geographic location (e.g., city, state, country) and for each client device type and configuration (e.g., each browser, each hardware device) covered in the in-field performance measurements. Such evaluations may include:
  Comparison of the response time for the city/browser/ device to a fixed threshold;
  Comparison of the response time for the city/browser/ device to response time for another city/browser/device; and
  Comparison of the response time for the city/browser/ device to response time for that same city/browser/ device on a date in the past—either a fixed date or relative date.

For example, imagine that we have an application which is being deployed in a datacenter in Washington, D.C., USA, and the developer wants to validate its performance around the world. So, the developer builds a synthetic performance measurement script with the following steps:
  1. Open site homepage;
  2. Log in as user 'XYZ' with password 'Really_Secret';
  3. Select link "Account information"; and
  4. Enter (some field information) and click "View details".

The synthetic performance test script may, for example, also indicate that it should be executed on the following city, browser, and device combinations:
  1. New York, desktop IBM-compatible Personal Computer (PC):
    1a: Microsoft Internet Explorer (IE) 11 browser
    1b: Google Chrome browser
  2. San Diego, emulated Google Android smartphone on a 4G mobile network:
    2a: Mozilla Firefox mobile browser
    2b: Google Chrome mobile browser
  3. Sao Paulo, Apple iPad 4 on Wi-Fi network, Apple Safari browser
  4. London, desktop IBM-compatible Personal Computer (PC):
    4a: Microsoft Internet Explorer (IE) 11 browser
    4b: Mozilla Firefox desktop browser
    4c: Google Chrome browser
  5. Sydney, Apple Macintosh laptop computer with Apple Safari browser
  6 . . . and other combinations as desired The synthetic performance test script might then specify performance criteria as follows:
  At Step 1 (Site homepage), median response time less than 4 seconds for test locations 1a and 1b;
  At all test steps in test locations 2a, 2b, 4a, 4b, and 4c, median response times no more than 2 seconds higher than the corresponding test step for location 1a;
  At all test steps in test location 3, a 95th percentile response time no more than 1 second higher than what was recorded on Jul. 1, 2015 for the same step, same location;
  At step 4 (click on "View details") in test location 5, an average response time no more than 3 seconds higher than the average recorded over the last week;
  et cetera.

Please note that the thresholds and limits in the foregoing example, however, are not absolute values, but rather are values which are relative to other test values. For example, a certain amount of increased delay in response may be allowed relative to a previous test for the same step, location and client device configuration. Or, in another situation, a certain amount of increase in delay relative to a neighboring geographic location at the same step may be allowed. The relative amounts can be set values, such as plus 3 seconds, or expressed as percentages, such as an increase of 10%.

These relative test result thresholds as compared to the same or different locations; same or different times of day, days of the week, etc.; same or different client device hardware configurations; same or different browser types; and same or different network connection types and speeds more closely reflect how real users judge whether or not to continue to wait for a web site to respond or to browse to another web site. Two users in the same living room on the same Wi-Fi at the same time, but using different client devices (e.g., one an Apple tablet computer and the other an Android mobile smartphone) may actually ask each other, "is your Wi-Fi really going slow?" If the other person says, "yes", then both users will be more patient and will tend to wait longer for a response. So, relative synthetic performance measurements, interlocked with the stages of the continuous development pipeline, provide an improvement to the entire development, test, verification and monitoring life cycle of a software product because it more closely resembles the end user's satisfaction with the product as compared to a non-interlocked APM and pipeline process that uses absolute QoS and performance thresholds.

Still further improvement can be obtained through embodiments of the present invention through comparing the relative performance of lab test results to synthetic performance test results, as well as through comparing on-going in-field synthetic performance test results to lab test results and/or other synthetic performance test results.

For example, as a program feature or enhancement flows through the continuous development pipeline, a developer may create a synthetic performance test script with a threshold that a certain feature, such as calculating a residual loan balance, may not be more than 10% slower than the previous lab test result for the previous release of the software product, and may not be more than 15% slower than the previous synthetic performance test on an Apple iPad using Safari browser from Tacoma, Washington, USA, over a 100 Mbit Wi-Fi connection during a week day. If either threshold is violated (e.g., the software change causes a slowing of the response time by more than 10% or 15%, relatively), then the pipeline would automatically reject promotion of the software code to the next stage in the pipeline. However, if the relative thresholds are met according to the associated test script with the feature code, then the pipeline would automatically promote the feature code to the next stage in the pipeline.

Exemplary Embodiments

Turning to FIG. 1, a logical process (100), suitable for encoding into program instructions and execution by a computer, encoding into custom electronic logic circuits, or a combination of both, is shown according to at least one embodiment of the present invention. In this diagram, solid lines with arrow heads represent transitions from one step to another step, while dotted lines with arrow heads represent transmission, storing, retrieving and access of information and data. This diagram shows two logical sub-processes which are related through the test results storage (125)— along the left side of the diagram is an exemplary logical process (101-106) to trigger the creation of initial and subsequent test results, and along the right side of the diagram is an exemplary logical process (107-110) to compare newer results to older results and to perform certain automated actions (111) as a result of the comparison.

After selecting and defining a synthetic performance test (101), a first instance of the test is performed (102), which generates a "baseline" set of results that are stored (125) for later reference. Then, the status of a particular program product, whether in development or deployed, is monitored for changes, such as, but not limited to, changes in the position (103) within a continuous development pipeline, change of a performance objective (104) (e.g., delay time, maximum load capacity, addition of a supported browser and/or client device, etc.), expiration of a delay timer (105) (e.g., periodic re-test), or other status change criteria.

When such a change is detected or a period of time since the last execution of the synthetic performance test has elapsed, a synthetic performance test is selected and re-executed (106), generating additional test results which are stored (125) for future reference. Each set of test results are stored with relevant associated test conditions, such as time, date, geographic location, operating system, browser type and version, client device characteristics (processor, memory capacity, etc.) and network characteristics (wireless or wired, speed, etc.) to enable performing appropriate relative comparisons for future test results.

As such, the test results storage (125), such as a database (centralized or distributed), accumulates the baseline results as well as a plurality of subsequent results from re-runs of the same synthetic performance tests, albeit not only on the same client conditions all the time, but also over a wide variety of client conditions, from both tests performed while a program code element is within the continuous development pipeline, as well as while that code element is deployed in the field.

A set of relative limits (107) is also provided to this particular embodiment, as described in the foregoing paragraphs using examples. The relative limits may be expressed and recorded in terms of same or similar client conditions (e.g., same browser, same geographic location, same network connection mode), as well as between different client device conditions (e.g., Firefox browser shouldn't be more than X % faster or slower than Safari; Wi-Fi connected clients shouldn't be more than Y % faster or slower than wire-connected clients, etc.).

The stored results (125) are retrieved or accessed, and compared (108) against these relative limits (107). This comparison can be event-driven, such as a trigger occurring (e.g., 103, 104, 106). In some other embodiments, this may also be done periodically, continuously, or some combination of time-based and event-driven Depending on the results of the comparison, one or more quality of service machine logic rule(s) (110) are executed (111), which may include but are not limited to generating automatic reports, automatically reconfiguring one or more enterprise computing systems (e.g., allocating more server memory, distributing server load more or less, etc.), and automatically enabling/disabling promotion of a program code element within a continuous development pipeline from one stage to the next.

Figure 2:
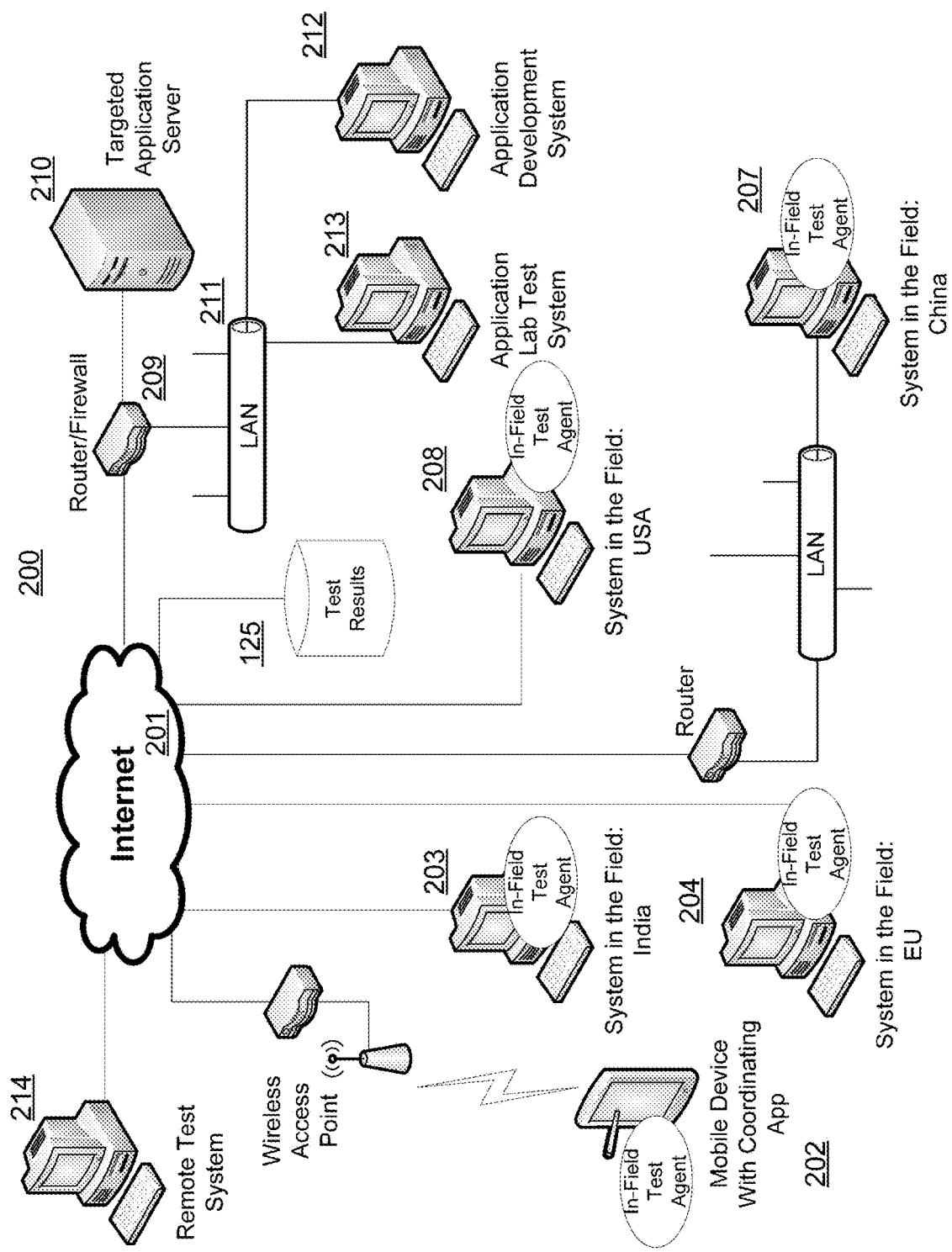
FIG. 2 illustrates an exemplary constellation of computers, processes, and data communications networks according to at least one embodiment of the present invention.

Referring now to FIG. 2, a depiction of an improved and enhanced constellation (200) of computing system components, according to the present invention, is depicted. In this arrangement, the targeted application server (210) which is being deployed, modified, upgraded, etc., using a continuous development pipeline methodology and associated tools, is protected by a router and firewall (209) and connected to the internet (201) for access by a plurality of in-field client devices (202, 203, 204, 207, 208), as well as to the development systems (212) and lab test systems (213) via a local network (211). The synthetic performance measurements and synthetic monitoring results storage (125) may be accessible by all systems via the internet and local networks.

For the purposes of this illustration, some of the client devices are in different geographic locales (EU, USA, China, India), some are interconnected via Wi-Fi, some are interconnected by wired connections, some are interconnected by a combination of wireless and wired connections, and some are remote test systems (214) under control of the program developers. Many of the in-field client devices are also provided with a synthetic performance test script execution function ("In-Field Test Agent"), such as a client component of the aforementioned APM systems.

One intention of this diagram is to illustrate the wide variety of "last mile" client conditions than can exist, but in reality, the possible combinations of conditions can reach into many thousands of combinations when the variations of operating systems and versions, hardware configurations, user settings and preference, etc., are also factored in.

Figure 3:
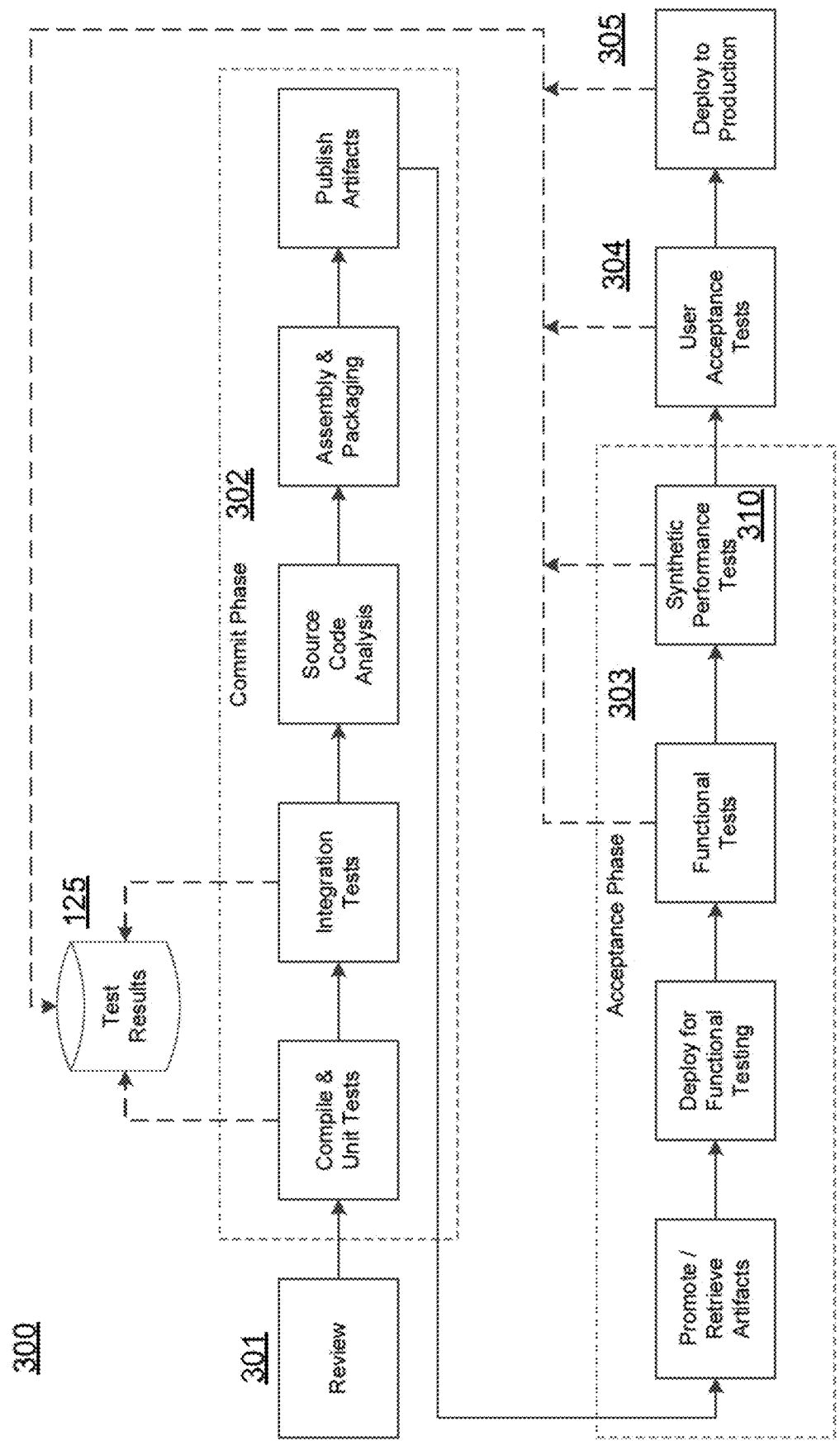
FIG. 3 depicts an improved continuous development pipeline realized through various known development, test, configuration, and deployment systems and interlocked to synthetic performance measurements according to the present invention.

As such, FIGS. 1 and 2 illustrate exemplary hardware and logical embodiments available within the scope of the present invention. FIG. 3 illustrates how the continuous development pipeline process (300) is improved and modified, with the express intention to point out to the reader that this is more than just a methodology. Many technology-based products are implied in this diagram which aid in the cataloging of program code elements (modules, routines, source code, libraries, etc.), orchestrate the development and execution of test scripts, and control access to code elements in which designated stage of developing to prohibit or enforce their inclusion in beta builds as well as release (production) builds of the program product. Further, technology for automatically propagating and distributing upgrades to in-field installed copies of the product, and for executing synthetic performance tests, such as advanced configuration management and APM systems are also implied in this diagram.

So, a typical pipeline consists of a review stage (301), a commit phase (302), an acceptance phase (303), a user acceptance test phase (304), and a deployment stage (305). Each phase may also have several stages within it, as illustrated, for example. Such a pipeline, including the implied technology-based systems for software development, test, and configuration control, is improved by adding at least one stage (310) of executing a synthetic performance test to establish at least one baseline test result, which is then stored (125) for later reference in the relative performance test comparisons as shown in FIG. 2. In this exemplary embodiment, some or all of steps 101-106 and 107-111 of FIG. 1 are encapsulated by the added stage (310) in the pipeline. Further, in at least one available embodiment according to the present invention, unit tests, integration tests, functional test, user acceptance tests, etc., may also be stored (125) for potential use in the relative comparisons according to the logical processes of the invention.

Figure 4:
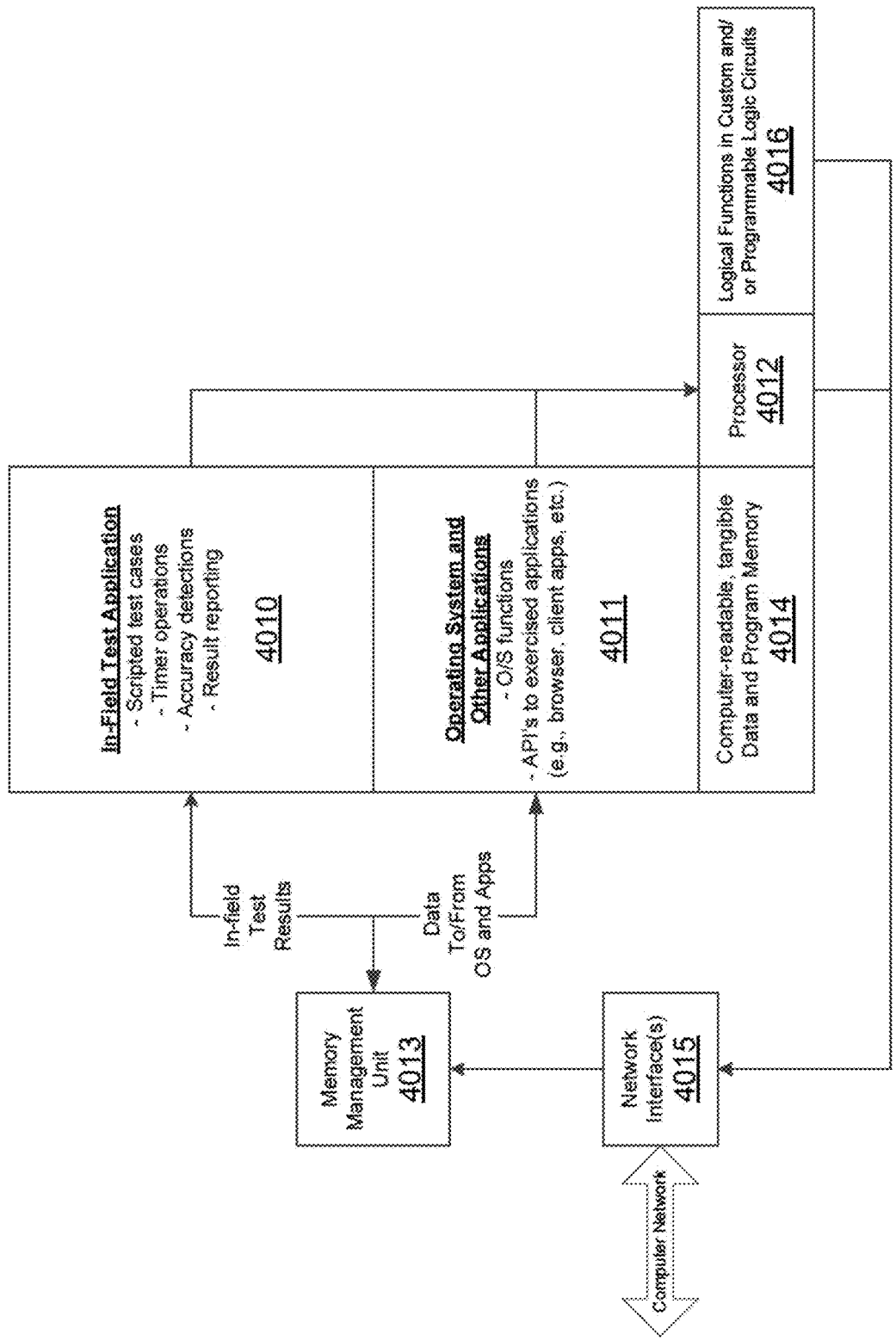
FIG. 4 depicts a computer-based embodiment according to the present invention.

Referring now to FIG. 4, a custom computer platform implementation of the present invention is illustrated in a general sense, in which the test functions may be realized in executable program components (4010) or in custom or programmable electronic circuits (4016), in coordination and cooperation with an operating system (4011), computer memories (4014) (PALs, PLDs, etc.), one or more processors (4012), memory handlers (4013) (DMA controller, memory handler processor, etc.), and one or more interfaces to computer and data networks (4015) (SCSI, PCI, IDE, Ethernet, WiFi, USB, cellular data, etc.). As such, many combinations of software and hardware improvements to existing computer systems are available within the scope of the present invention.

Computer Program Product Embodiments. The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Conclusion. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process or processes.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method comprising:
   selecting, by a computer, a synthetic performance test to measure a first set of performance attributes of a web-based service to a network-connected client device;
   performing, by a computer, a first instantiation of the selected test within a continuous development pipeline, under a set of baseline conditions, to determine a set of baseline set of test result values for the first set of performance attributes;
   performing, by a computer, a second instantiation of the selected test under a set of conditions outside of the continuous development pipeline, to determine an additional set of test result values for the first set of performance attributes;
   determining, by a computer, a relative difference between the baseline set of test result values to the additional set of test result values;
   detecting, by a computer, that the determined relative difference exceeds at least one relative threshold, wherein the detecting is not reliant upon an absolute threshold; and
   responsive to the detecting, performing, by a computer, a machine logic rule to meet a quality of service objective associated with the web-based service, wherein the executed rule comprises at least one or more rules selected from the group consisting of automatically reconfiguring an enterprise computing system associated with the web-based service outside the continuous development pipeline, and controlling advancement of a program code element within the continuous development pipeline.

2. The method as set forth in claim 1 wherein the machine logic rule to control advancement of a program code element within the continuous development pipeline comprises a control selected from the group consisting of automatically enabling promotion of a program code element of the web-based service to a next stage, automatically disabling promotion of a program code element of the web-based service, and automatically enabling promotion of a program code element of the web-based service to a production environment.

3. The method as set forth in claim 1 wherein the second instantiation of the selected test is performed on a program code element in a production environment on a client device.

4. The method as set forth in claim 1 wherein the second instantiation of the selected test is performed on a program code element in a production environment on a server device.

5. The method of claim 1 wherein base conditions comprise one or more conditions selected from the group consisting of a geographical location of a tested device, a logical network location of a tested device, a time of test on a tested device, a weather condition at a geographic location of a client device, a hardware attribute of a tested device, a software attribute of a tested device, a firmware attribute of tested device, a network connection attribute to a tested device, a speed of data communication, a speed of rendering, and an accuracy of data communication.

6. The method as set forth in claim 1 wherein the relative thresholds are established with respect to matching test conditions between the compared sets of test results.

7. A computer program product comprising:
a tangible, computer-readable memory device; and
program instructions encoded by the tangible, computer-readable memory device for causing a processor to, when executed, perform steps of:
selecting a synthetic performance test to measure a first set of performance attributes of a web-based service to a network-connected client device;
performing a first instantiation of the selected test within a continuous development pipeline, under a set of baseline conditions, to determine a set of baseline set of test result values for the first set of performance attributes;
performing a second instantiation of the selected test under a set of conditions outside of the continuous development pipeline, to determine an additional set of test result values for the first set of performance attributes;
determining a relative difference between the baseline set of test result values to the additional set of test result values;
detecting that the determined relative difference exceeds at least one relative threshold, wherein the detecting is not reliant upon an absolute threshold; and
responsive to the detecting, performing a machine logic rule to meet a quality of service objective associated with the web-based service, wherein the executed rule comprises at least one or more rules selected from the group consisting of automatically reconfiguring an enterprise computing system associated with the web-based service outside the continuous development pipeline, and controlling advancement of a program code element within the continuous development pipeline.

8. The computer program product as set forth in claim 7 wherein the machine logic rule to control advancement of a program code element within the continuous development pipeline comprises a control selected from the group consisting of automatically enabling promotion of a program code element of the web-based service to a next stage, automatically disabling promotion of a program code element of the web-based service, and automatically enabling promotion of a program code element of the web-based service to a production environment.

9. The computer program product as set forth in claim 7 wherein the second instantiation of the selected test is performed on a program code element in a production environment on a client device.

10. The computer program product as set forth in claim 7 wherein the second instantiation of the selected test is performed on a program code element in a production environment on a server device.

11. The computer program product as set forth in claim 7 wherein base conditions comprise one or more conditions selected from the group consisting of a geographical location of a tested device, a logical network location of a tested device, a time of test on a tested device, a weather condition at a geographic location of a client device, a hardware attribute of a tested device, a software attribute of a tested device, a firmware attribute of tested device, a network connection attribute to a tested device, a speed of data communication, a speed of rendering, and an accuracy of data communication.

12. The computer program product as set forth in claim 7 wherein the relative thresholds are established with respect to matching test conditions between the compared sets of test results.

13. A system comprising:
a computer processor;
a tangible, computer-readable memory device; and
program instructions encoded by the tangible, computer-readable memory device for causing the processor to, when executed, perform steps of:
selecting a synthetic performance test to measure a first set of performance attributes of a web-based service to a network-connected client device;
performing a first instantiation of the selected test within a continuous development pipeline, under a set of baseline conditions, to determine a set of baseline set of test result values for the first set of performance attributes;
performing a second instantiation of the selected test under a set of conditions outside of the continuous development pipeline, to determine an additional set of test result values for the first set of performance attributes;
determining a relative difference between the baseline set of test result values to the additional set of test result values;
detecting that the determined relative difference exceeds at least one relative threshold, wherein the detecting is not reliant upon an absolute threshold; and
responsive to the detecting, performing a machine logic rule to meet a quality of service objective associated with the web-based service, wherein the executed rule comprises at least one or more rules selected from the group consisting of automatically reconfiguring an enterprise computing system associated with the web-based service outside the continuous development pipeline, and controlling advancement of a program code element within the continuous development pipeline.

14. The system as set forth in claim 13 wherein the machine logic rule to control advancement of a program code element within the continuous development pipeline comprises a control selected from the group consisting of automatically enabling promotion of a program code element of the web-based service to a next stage, automatically disabling promotion of a program code element of the web-based service, and automatically enabling promotion of a program code element of the web-based service to a production environment.

15. The system as set forth in claim 13 wherein the second instantiation of the selected test is performed on a program code element in a production environment on a client device.

16. The system as set forth in claim 13 wherein the second instantiation of the selected test is performed on a program code element in a production environment on a server device.

17. The system as set forth in claim 13 wherein base conditions comprise one or more conditions selected from the group consisting of a geographical location of a tested device, a logical network location of a tested device, a time of test on a tested device, a weather condition at a geographic location of a client device, a hardware attribute of a tested device, a software attribute of a tested device, a firmware attribute of tested device, a network connection attribute to a tested device, a speed of data communication, a speed of rendering, and an accuracy of data communication.

18. The system as set forth in claim 13 wherein the relative thresholds are established with respect to matching test conditions between the compared sets of test results.

* * * * *